(12) United States Patent
Zhang et al.

(10) Patent No.: US 12,434,171 B2
(45) Date of Patent: Oct. 7, 2025

(54) PRODUCTION APPARATUS AND PRODUCTION METHOD OF SUCROSE-6-ESTER

(71) Applicant: ANHUI JINHE INDUSTRIAL CO., LTD., Chuzhou (CN)

(72) Inventors: Zhengsong Zhang, Chuzhou (CN); Zhenghua Li, Chuzhou (CN); Zhijian Yang, Chuzhou (CN); Jingang Zhao, Chuzhou (CN); Congyong Zhang, Chuzhou (CN); Xuelian Zheng, Chuzhou (CN)

(73) Assignee: Anhui Jinhe Industrial Co., Ltd., Chuzhou (CN)

( * ) Notice: Subject to any disclaimer, the term of this patent is extended or adjusted under 35 U.S.C. 154(b) by 498 days.

(21) Appl. No.: 18/016,834

(22) PCT Filed: Feb. 19, 2021

(86) PCT No.: PCT/CN2021/076810
§ 371 (c)(1),
(2) Date: Jan. 18, 2023

(87) PCT Pub. No.: WO2022/174381
PCT Pub. Date: Aug. 25, 2022

(65) Prior Publication Data
US 2023/0294012 A1    Sep. 21, 2023

(51) Int. Cl.
*B01D 1/22* (2006.01)
*B01D 5/00* (2006.01)
(Continued)

(52) U.S. Cl.
CPC ............. *B01D 1/222* (2013.01); *B01D 5/006* (2013.01); *B01J 19/24* (2013.01); *C07H 13/04* (2013.01); *B01J 2219/00162* (2013.01)

(58) Field of Classification Search
CPC .......... B01D 1/222; B01D 5/006; B01D 1/04; B01D 1/223; B01D 5/0015; B01D 5/0018;
(Continued)

(56) References Cited

FOREIGN PATENT DOCUMENTS

| CN | 1446223 A | 10/2003 |
|---|---|---|
| CN | 101605804 A | 12/2009 |

(Continued)

OTHER PUBLICATIONS

China Office Action, App No. 202180000399.1, dated Feb. 7, 2022.
PCT International Search Report (ISR)—PCT/CN2021/076810 (5 pages).

*Primary Examiner* — Thuan D Dang
(74) *Attorney, Agent, or Firm* — HEA Law PLLC; Darrin A. Auito

(57) ABSTRACT

A production apparatus of sucrose-6-ester is disclosed and includes a distillation separation tank, a reaction tank, and a condensated water collection tank, where the distillation separation tank is arranged above the reaction tank and the condensated water collection tank, and includes a shell and a heating-roller distillation device including a plurality of heating rollers arranged from top to bottom between front and rear side walls of the shell; two ends of the U-shaped plate are respectively fixed to bottoms of the front and rear side walls; a feed pipe is provided at a top of the shell, the condensated water outlet pipe is arranged at a bottom surface of the shell and is connected to the condensated water collection tank, and the liquid evaporation residue discharge pipe penetrates through the bottom surface of the shell, is connected to the U-shaped plate, and is connected to the reaction tank.

20 Claims, 6 Drawing Sheets

(51) Int. Cl.
*B01J 19/24* (2006.01)
*C07H 13/04* (2006.01)

(58) Field of Classification Search
CPC . B01D 3/009; B01J 19/24; B01J 2219/00162; C07H 13/04; C07H 1/00; C07H 1/06; C07H 13/06; Y02P 20/10
See application file for complete search history.

(56) References Cited

FOREIGN PATENT DOCUMENTS

| | | | | |
|---|---|---|---|---|
| CN | 102639551 A | 8/2012 | | |
| CN | 104817597 A | 8/2015 | | |
| CN | 212315609 U | 1/2021 | | |
| EP | 0776903 B1 | 1/2003 | | |
| GB | 2474310 B | * 2/2012 | ............. | C07H 13/08 |

\* cited by examiner

Turning on the heating-roller distillation device, setting each heating roller to a preset temperature, and feeding a reaction solution through a feed port of the distillation separation tank, such that the reaction solution is separated into a liquid evaporation residue and a water vapor on an outer wall of each heating roller, wherein the reaction solution comprises sucrose, an aprotic polar solvent, and an organotin esterification catalyst; collecting the liquid evaporation residue into the U-shaped cavity and allowing the liquid evaporation residue to flow into the reaction tank through the liquid evaporation residue discharge pipe; and condensing the water vapor into liquid water at the left and right side walls of the shell, and allowing the liquid water to flow to the bottom of the shell and then flow into the condensated water collection tank through the condensated water outlet pipe ⸺ S610

Performing an esterification reaction by the liquid evaporation residue entering the reaction tank with a carboxylic anhydride entering through the carboxylic ester feed pipe under preset conditions to produce a sucrose-6-ester-containing solution ⸺ S620

FIG. 6

PRODUCTION APPARATUS AND PRODUCTION METHOD OF SUCROSE-6-ESTER

CROSS REFERENCE TO RELATED APPLICATION

The present application is a national stage application of International Patent Application No. PCT/CN2021/076810, filed on February 19, 2021, which is incorporated by reference herein in its entirety.

TECHNICAL FIELD

The present disclosure belongs to the technical field of fine chemical industry, and in particular relates to a production apparatus and production method of sucrose-6-ester.

BACKGROUND

Sucralose is a new sweetener with advantages such as high sweetness, no calories, high stability, and high safety, and has very promising market prospects. Sucralose-6-ester is an important intermediate in the production of sucralose.

In the prior art, a process for synthesizing sucrose-6-ester mainly includes: mixing sucrose, an aprotic polar solvent, and an organotin esterification catalyst to obtain a first reaction mixture; then bringing the first reaction mixture into contact with a gas or solvent vapor capable of removing water for a specified period of time at a specific temperature and pressure, such that the water in the first reaction mixture is removed to obtain a second reaction mixture; and then adding carboxylic anhydride to the second reaction mixture to obtain a third reaction mixture, and maintaining the third reaction mixture for a sufficient time to obtain the sucrose-6-ester. This process needs to use the gas or solvent vapor capable of removing water, which seriously affects the continuity of a production process of the sucrose-6-ester, prolongs the production cycle, and reduces the production efficiency. In addition, the consumption of a large amount of the gas or solvent capable of removing water greatly increases the production cost and energy consumption.

It should be noted that the statements herein merely provide background information related to the present disclosure and do not necessarily constitute the prior art.

SUMMARY

In view of the above problems, a production apparatus and a production method of sucrose-6-ester is provided in the present disclosure to overcome the above problems or at least partially solve the problems.

According to an aspect of the present disclosure, a production apparatus of sucrose-6-ester is provided, including: a distillation separation tank, a reaction tank, and a condensated water collection tank, where the distillation separation tank is arranged above the reaction tank and the condensated water collection tank;

the distillation separation tank includes a shell, a heating-roller distillation device, a feed pipe, a U-shaped plate, a plurality of heat exchange tubes, a condensated water outlet pipe, and a liquid evaporation residue discharge pipe; the heating-roller distillation device includes a plurality of heating rollers, and the plurality of heating rollers are horizontally and closely arranged from top to bottom between front and rear side walls of the shell; two ends of the U-shaped plate are fixed to bottoms of the front and rear side walls of the shell, respectively, and the U-shaped plate is arranged to be not in contact with left and right side walls and a bottom surface of the shell and forms a U-shaped cavity; the plurality of heat exchange tubes are arranged in an inner cavity formed by the U-shaped plate and penetrate through the front and rear side walls of the shell; a feed pipe is provided at a top of the shell, the condensated water outlet pipe is arranged at the bottom surface of the shell, and the liquid evaporation residue discharge pipe penetrates through the bottom surface of the shell and is connected to the U-shaped plate;

the condensated water collection tank is connected to the condensated water outlet pipe; and the reaction tank is connected to the liquid evaporation residue discharge pipe.

In some embodiments, the production apparatus further includes a plurality of condensation plates penetrating through the left and right side walls of the shell at positions corresponding to the plurality of heating rollers.

In some embodiments, in the production apparatus, an end of the feed pipe located in the shell may be connected to a liquid material dispersion pipe.

In some embodiments, in the production apparatus, the heating-roller distillation device includes a power supply module, and the power supply module may be electrically connected to each heating roller to provide electrical energy for a heat transfer medium of the heating roller.

The heating-roller distillation device may include a drive module, the drive module may include a motor and a gear train, the motor may be connected to the gear train, the gear train may be connected to each heating roller, and the motor may drive each heating roller to rotate via the gear train.

In some embodiments, in the production apparatus, diameters and lengths of the plurality of heating rollers may increase gradually from top to bottom; and adjacent two heating rollers may be arranged to rotate in opposite directions.

In some embodiments, in the production apparatus, the plurality of heating rollers may comprise three heating rollers, which are a first heating roller, a second heating roller, and a third heating roller from top to bottom.

Each of two ends of the first heating roller may be provided with a first circular baffle plate that has a diameter greater than a diameter of the first heating roller.

Each of two ends of the second heating roller may be provided with a first groove, and the first circular baffle plate may be embedded in the first groove.

Each of two ends of the third heating roller may be provided with a second circular baffle plate having a diameter greater than a diameter of the third heating roller.

A diameter of the third heating roller may be less than a width of the inner cavity formed by the U-shaped plate.

In some embodiments, in the production apparatus, preset heating temperatures of the plurality of heating rollers may decrease gradually from top to bottom.

In some embodiments, in the production apparatus, a scraper may be provided at a top end of a side wall of the U-shaped plate, an outer edge of the scraper abuts against a heating roller closest to the scraper, and an included angle between the scraper and a tangent line at an intersection point of the scraper with the heating roller closest to the scraper may be less than 90°.

In some embodiments, in the production apparatus, the U-shaped cavity and the inner cavity of the U-shaped plate each are provided with a liquid level sensor and a temperature sensor.

In some embodiments, in the production apparatus, the plurality of heat exchange tubes each include an evaporation section located inside the shell and a condensation section located outside the shell.

In some embodiments, in the production apparatus, a first solenoid valve may be provided on the liquid evaporation residue discharge pipe; a carboxylic ester feed pipe and a second vacuum pipe may be provided at a top of the reaction tank, and the second vacuum pipe is able to be connected to a vacuum pump; and a product discharge pipe may be provided at a bottom of the reaction tank, and a second solenoid valve may be provided on the product discharge pipe.

In some embodiments, in the production apparatus, a third solenoid valve may be provided on the condensated water outlet pipe; a third vacuum pipe may be provided at a top of the condensated water collection tank, and the third vacuum pipe is able to be connected to a vacuum pump; and the condensated water collection tank may be provided with a water outlet pipe, and a fourth solenoid valve may be provided on the water outlet pipe.

In some embodiments, in the production apparatus, the shell may be provided with a first vacuum pipe, and the first vacuum pipe is able to be connected to a vacuum pump.

In some embodiments, in the production apparatus, the shell may have an approximately trapezoidal cross section.

According to another aspect of the present disclosure, a production method of sucrose-6-ester is provided, where the production method is implemented by the production apparatus described above and includes:

a step of reaction solution separation: turning on the heating-roller distillation device, setting each heating roller to a preset temperature, and feeding a reaction solution through a feed port of the distillation separation tank, such that the reaction solution is separated into a liquid evaporation residue and a water vapor on an outer wall of each heating roller, where the reaction solution comprises sucrose, an aprotic polar solvent, and an organotin esterification catalyst; collecting the liquid evaporation residue into the U-shaped cavity and allowing the liquid evaporation residue to flow into the reaction tank through the liquid evaporation residue discharge pipe; and condensing the water vapor into liquid water at the left and right side walls of the shell, and allowing the liquid water to flow to the bottom of the shell and then flow into the condensated water collection tank through the condensated water outlet pipe; and a step of esterification reaction: performing an esterification reaction by the liquid evaporation residue entering the reaction tank t with a carboxylic anhydride entering through the carboxylic ester feed pipe under preset conditions to produce a sucrose-6-ester-containing solution.

In summary, the present disclosure has the following beneficial effects: A production apparatus provided with a heating-roller distillation device is designed, such that a reaction solution can be rolled into a thin liquid film under the cooperation of a plurality of heating rollers, and then heated and distilled, thereby achieving the purpose of efficiently removing the moisture in the reaction solution to prepare the sucrose-6-ester. In addition, the distillation tank and the reaction tank are arranged from top to bottom, and thus without additional power, the liquid evaporation residue can smoothly enter the reaction tank and perform an esterification reaction to produce a target product. The production apparatus of the present disclosure achieves the integration of distillation, cooling, mixing, and reaction steps of a preparation process of sucrose-6-ester, such that raw materials can be continuously fed into the production apparatus. The reaction solution separation and esterification reaction steps are performed without interruption, such that a sucrose-6-ester can be continuously produced, which greatly shortens the production cycle and improves the production efficiency of the sucrose-6-ester. The production apparatus has a small overall volume, a small floor space, a simple structure, and strong economy, which avoids the use of a large amount of a gas or solvent vapor capable of removing water in the process existing in the prior art, greatly reduces the production cost, and overcomes the defects in the prior art such as high energy consumption and high time consumption caused by the fact that the second reaction mixture needs to be pressed into another space and then mixed with a carboxylic anhydride.

The above description is merely a summary of the technical solutions of the present disclosure. In order to allow the technical means of the present disclosure to be understood clearly and implemented in accordance with the content of the specification and allow the above and other objectives, features, and advantages of the present disclosure to be obvious and easy to understand, specific implementations of the present disclosure are described below.

BRIEF DESCRIPTION OF THE DRAWINGS

By reading the detailed description of the following preferred embodiments, various other advantages and benefits will become apparent to those of ordinary skill in the art. The accompanying drawings are provided merely to illustrate the preferred embodiments, rather than to limit the present disclosure. Throughout the accompanying drawings, the same reference numerals represent the same component. In the accompanying drawings:

FIG. 6 is a schematic flow chart of a production method of sucrose-6-ester according to an embodiment of the present disclosure.

DETAILED DESCRIPTION OF THE EMBODIMENTS

Exemplary embodiments of the present disclosure will be described in detail below with reference to the accompanying drawings. Although the accompanying drawings show exemplary embodiments of the present disclosure, it should be understood that the present disclosure may be implemented in various forms and should not be limited to the embodiments set forth herein. Instead, these embodiments are provided to provide a thorough understanding of the present disclosure, and fully convey a scope of the present disclosure to those skilled in the art.

The concept of the present disclosure is as follows: In the prior art, a reaction solution for producing sucrose-6-ester needs to first undergo water removal with a vapor or solvent in a reactor, and then is pressed into another reactor to react with a carboxylic anhydride to produce the sucrose-6-ester. In the above process, the water removal with the vapor or solvent requires a high energy consumption, bulky device, and a large floor space, and can only lead to insufficient water removal; after the water is removed, the reaction solution also needs to be pressed into another reactor to undergo an esterification reaction, which requires additional energy and time and reduces the production efficiency of the sucrose-6-ester; and the production mode in the prior art is discontinuous, and the next reaction can only be conducted after the previous reaction is completed, which also seriously affects the production efficiency of the sucrose-6-ester.

Figure 1:
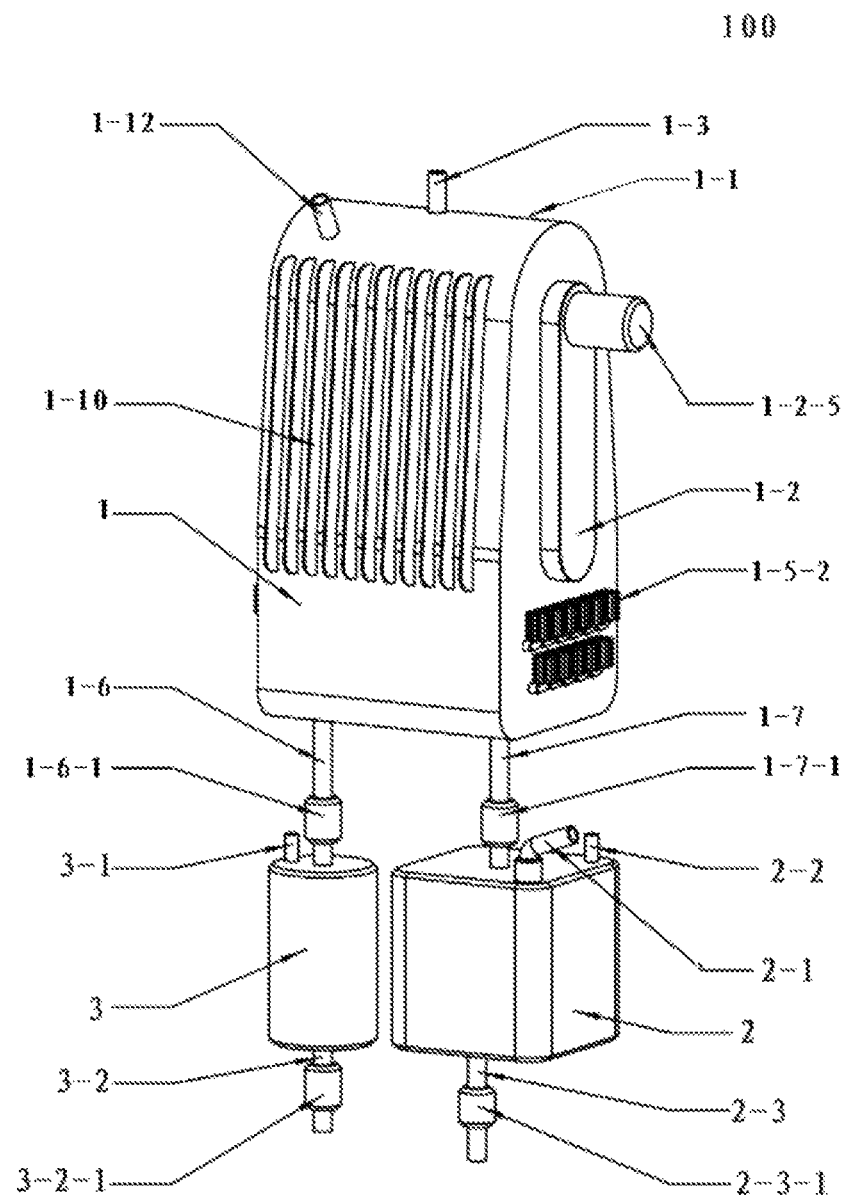
FIG. 1 is a schematic diagram illustrating an external overall structure of a production apparatus of sucrose-6-ester according to an embodiment of the present disclosure.
Figure 2:
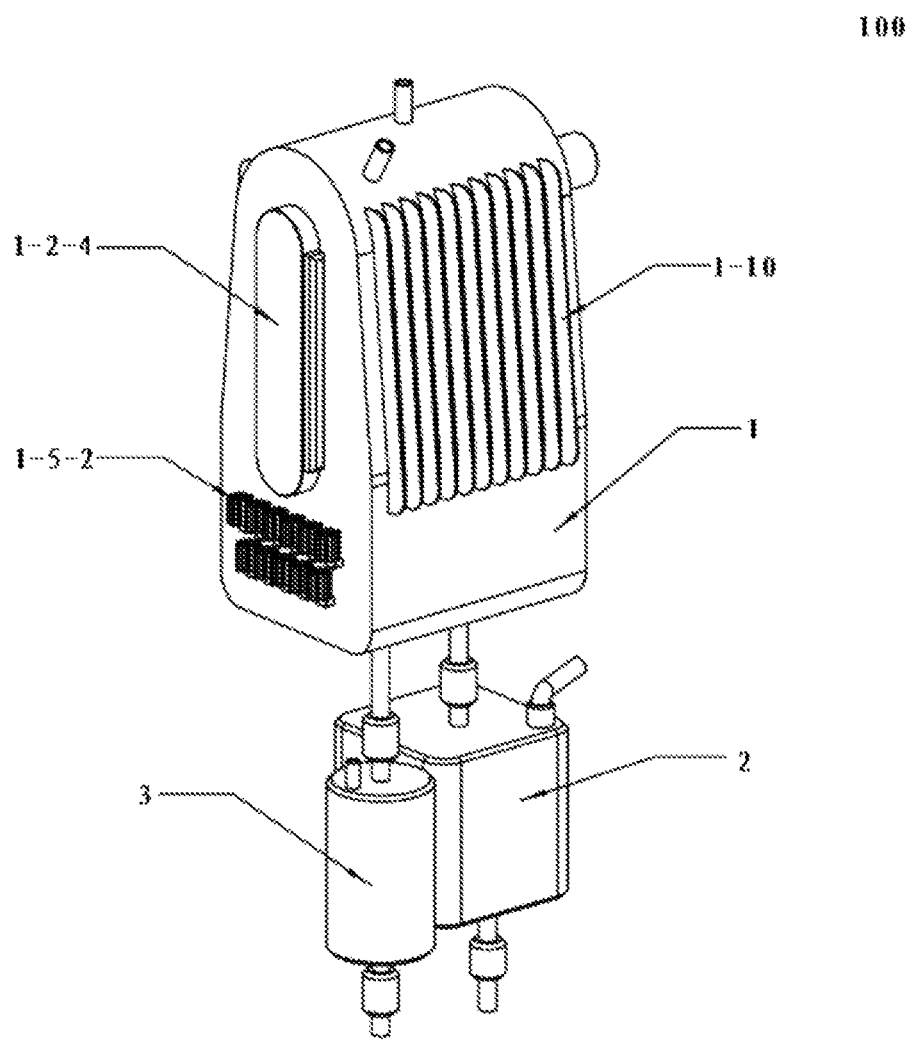
FIG. 2 is a schematic diagram illustrating an external overall structure of a production apparatus of sucrose-6-ester according to another embodiment of the present disclosure.
Figure 3:
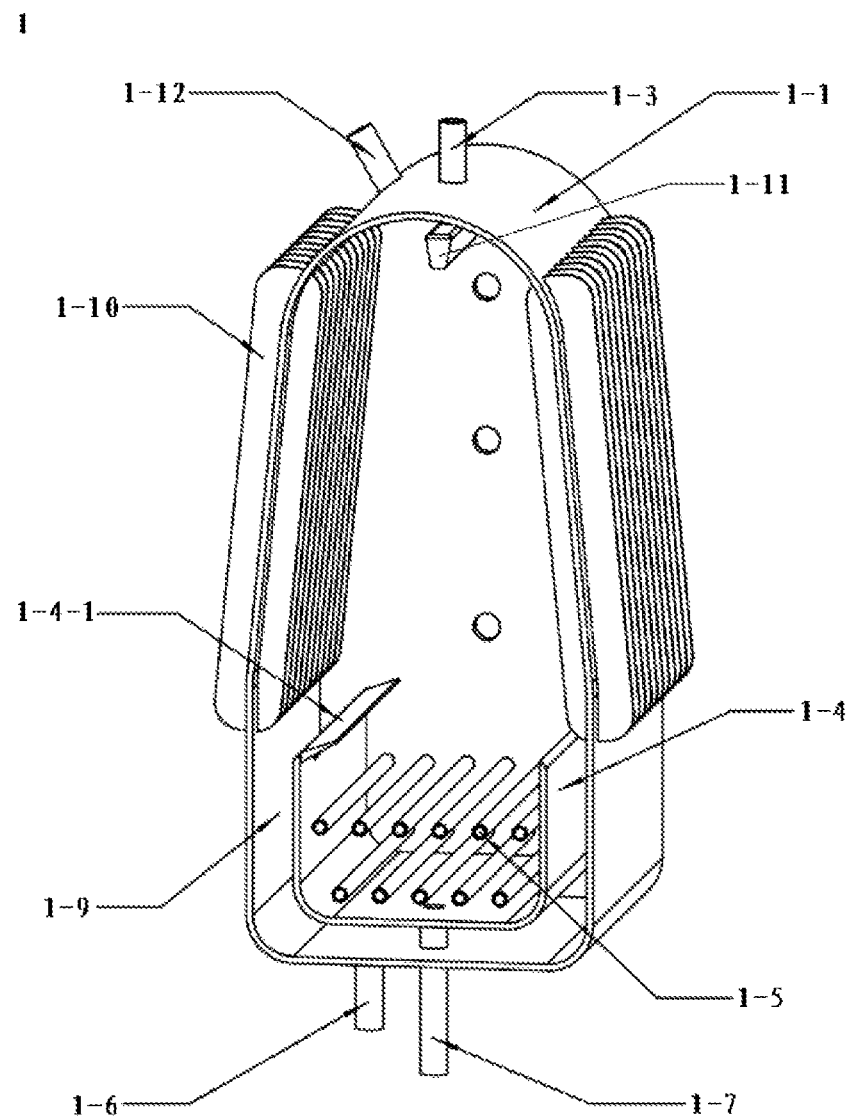
FIG. 3 is a schematic diagram of a distillation separation tank of a production apparatus of sucrose-6-ester in which a front side wall of a shell according to an embodiment of the present disclosure is removed (without a heating-roller distillation device)
Figure 4:
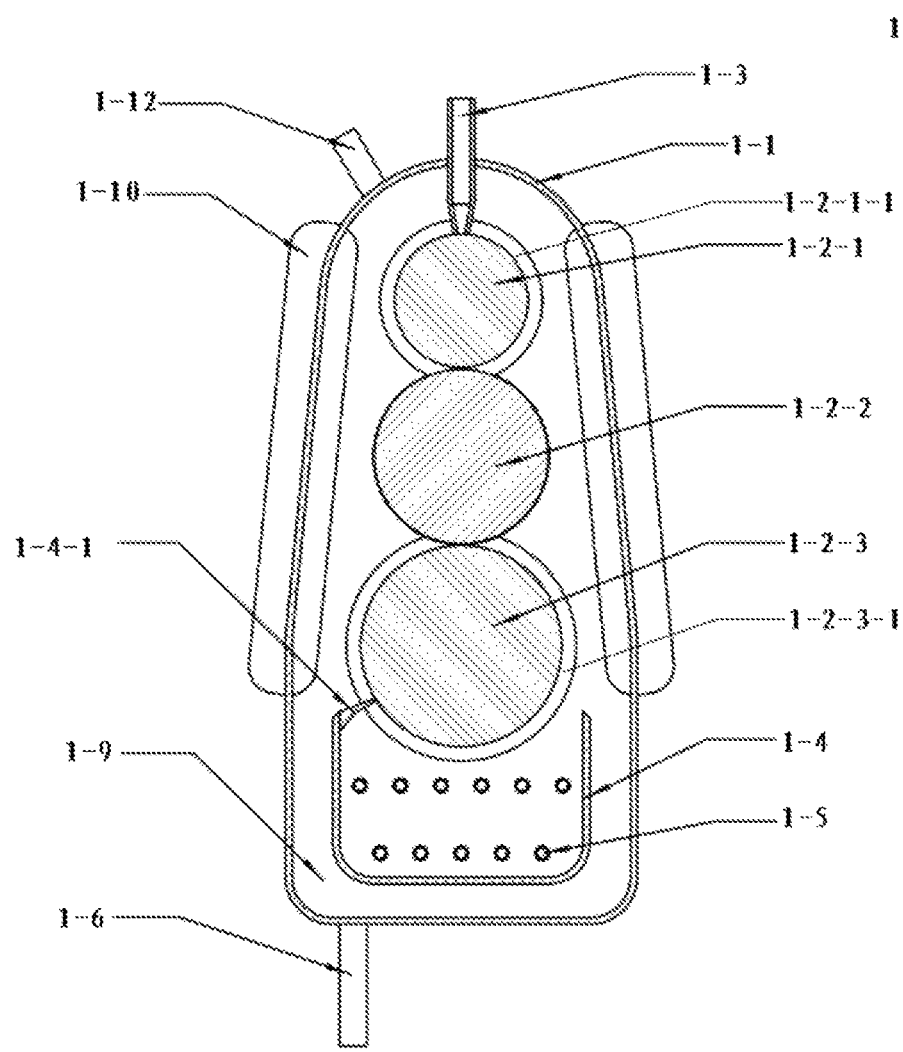
FIG. 4 is a schematic diagram illustrating a cross-sectional view of a distillation separation tank of a production apparatus of sucrose-6-ester taken along a radial cross section through intermediate positions of front and rear side walls of a shell according to an embodiment of the present disclosure.
Figure 5:
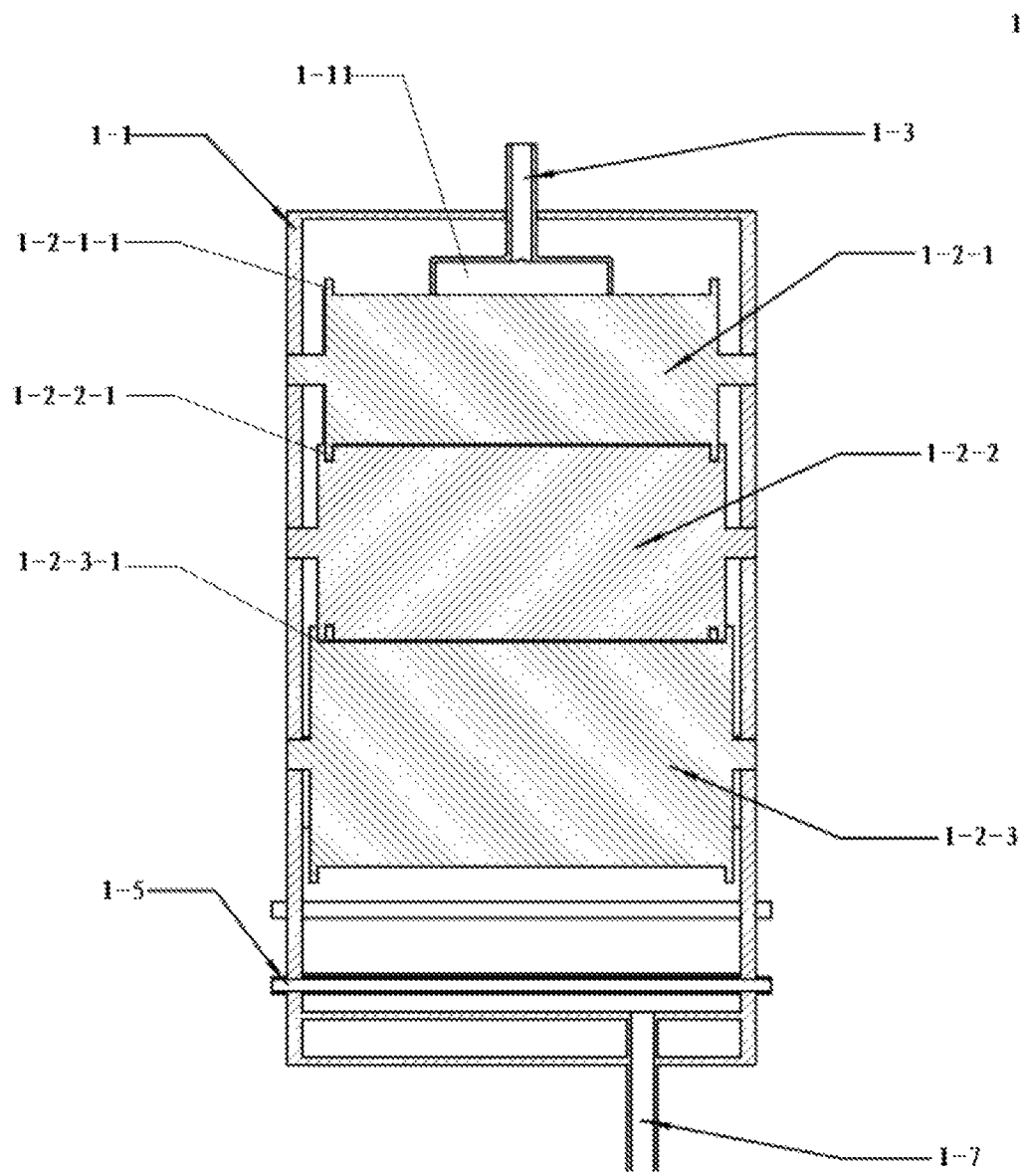
FIG. 5 is a schematic diagram illustrating a cross-sectional view of a distillation separation tank of a production apparatus of sucrose-6-ester taken along a radial cross section through intermediate positions of left and right side walls of a shell according to an embodiment of the present disclosure.

FIG. 1 is a schematic diagram illustrating an external overall structure of a production apparatus of sucrose-6-ester according to an embodiment of the present disclosure; FIG. 2 is a schematic diagram illustrating an external overall structure of a production apparatus of sucrose-6-ester according to another embodiment of the present disclosure; FIG. 3 is a schematic diagram of a distillation separation tank of a production apparatus of sucrose-6-ester that is split from a front side wall of a shell according to an embodiment of the present disclosure (without a heating-roller distillation device): FIG. 4 is a schematic diagram illustrating a cross-sectional view of a distillation separation tank of a production apparatus of sucrose-6-ester taken along a radial cross section through intermediate positions of front and rear side walls of a shell according to an embodiment of the present disclosure; and FIG. 5 is a schematic diagram illustrating a cross-sectional view of a distillation separation tank of a production apparatus of sucrose-6-ester taken along a radial cross section through intermediate positions of left and right side walls of a shell according to an embodiment of the present disclosure.

As shown in FIGS. 1 to 5, the production apparatus of sucrose-6-ester 100 includes a distillation separation tank 1, a reaction tank 2, and a condensated water collection tank 3, where the distillation separation tank 1 is arranged above the reaction tank 2 and the condensated water collection tank 3.

The distillation separation tank 1 includes a shell 1-1, a heating-roller distillation device 1-2, a feed pipe 1-3, a U-shaped plate 1-4, a plurality of heat exchange tubes 1-5, a condensated water outlet pipe 1-6, and a liquid evaporation residue discharge pipe 1-7.

In some embodiments of the present disclosure, the distillation separation tank 1 may be made of a stainless steel material. In the present disclosure, four sides of the shell 1-1 of the distillation separation tank 1 are donated by a front side wall, a rear side wall, a left side wall, and a right side wall; and a cross section of the shell 1-1 of the distillation separation tank 1 may have, but is not limited to, a trapezoid shape.

The heating-roller distillation device 1-2 includes a plurality of heating rollers 1-2-1 (1-2-2, 1-2-3), and the plurality of heating rollers are horizontally and closely arranged from top to bottom between the front and rear side walls of the shell 1-1. In some embodiments of the present disclosure, 3 to 5 heating rollers are provided, and a gap between two adjacent heating rollers may be adjusted according to specific production factors, such as feeding speed and reaction solution viscosity. In some embodiments, a distance between surfaces of two adjacent heating rollers is no more than 1 mm. In some other embodiments, during use, a gap between two adjacent heating rollers may be adjusted according to specific production conditions.

During the operation of the production apparatus, the heating rollers rotate, such that the reaction solution gradually flows downward along surfaces of the heating rollers and is rolled into a thin liquid film between two adjacent heating rollers; and the heating rollers also heat the reaction solution to evaporate the moisture in the reaction solution into a water vapor, such that the reaction solution is separated into a water vapor and the liquid evaporation residue. In the present disclosure, the reaction solution is a mixed solution for preparing a sucrose-6-ester, including, but not limited to, sucrose, an aprotic polar solvent, and an organotin esterification catalyst; and after the distillation of the reaction solution, the liquid evaporation residue is obtained and reacts with a carboxylic anhydride to obtain a target product sucrose-6-ester.

Two ends of the U-shaped plate 1-4 are fixed to bottoms of the front and rear side walls of the shell 1-1, respectively, and the U-shaped plate 1-4 is arranged to be not in contact with the left and right side walls and a bottom surface of the shell 1-1 to form a U-shaped cavity 1-9.

A U-shaped plate 1-4 is arranged below a bottom heating roller 1-2-3, two ends of the U-shaped plate 1-4 are fixed to the front and rear side walls of the shell 1-1 at the bottom of the shell, and the U-shaped plate 1-4 is arranged to be not in contact with the left and right side walls and the bottom surface of the shell 1-1. That is, the U-shaped plate 1-4 divides the bottom of the shell 1-1 into two cavities, where one is an internal space of the U-shaped plate 1-4 and is designated as an inner cavity formed by the U-shaped plate 1-4; and the other one is a cavity formed by the U-shaped plate 1-4 with the left and right side walls and the bottom surface of the shell 1-1, and is designated as a U-shaped cavity 1-9. The two cavities are formed to separate a water vapor from the liquid evaporation residue. Specifically, due to the heat exchange between the left and right side walls of the shell 1-1 and the environment, a water vapor can be condensated into liquid water on the left and right side walls of the shell 1-1, and then the liquid water flows downward along the left and right side walls of the shell 1-1 into the U-shaped cavity 1-9; and the liquid evaporation residue flows downward along the heating roller 1-2-3 and finally drops into the inner cavity formed by the U-shaped plate 1-4, thereby realizing the separation of the water vapor and the liquid evaporation residue.

A plurality of heat exchange tubes 1-5 are provided in the inner cavity 1-8 formed by the U-shaped plate 1-4, and the plurality of heat exchange tubes 1-S penetrate through the front and rear side walls of the shell 1-1. The heat exchange tubes are provided to cool the liquid evaporation residue. Usually, the reaction solution is distilled at a high temperature to be removed moisture from the reaction solution, and the esterification reaction is usually reacted at a relatively low temperature and generally at room temperature or lower. In order to make the liquid evaporation residue reach a preset temperature of the esterification reaction as soon as possible, the heat exchange tubes 1-5 are provided. The heat exchange tubes 1-5 can exchange heat with the environment to quickly take away a large amount of heat of the liquid evaporation residue, thereby achieving the purpose of cooling the liquid evaporation residue.

A feed pipe 1-3 is provided at a top of the shell 1-1, a condensated water outlet pipe 1-6 is provided at the bottom surface of the shell 1-1, and the liquid evaporation residue discharge pipe 1-7 penetrates through the bottom surface of the shell 1-1 and is connected to the U-shaped plate 1-4; the condensated water collection tank 3 is connected to the condensated water outlet pipe 1-6; and the reaction tank 2 is connected to the liquid evaporation residue discharge pipe 1-7.

The reaction solution is pumped into the production apparatus from a feed port 1-3 and is separated into a water vapor and a liquid evaporation residue on the heating rollers; the water vapor is condensed into liquid water at the left and right side walls of the shell 1-1, and flows into the condensated water outlet pipe 1-6 and then into the condensated water collection tank 3; and the liquid evaporation residue drops into the inner cavity formed by the U-shaped plate 1-4, is cooled, and enters the reaction tank 2 through the liquid evaporation residue discharge pipe 1-7 to react with a carboxylic anhydride in the reaction tank 2 to generate a target product. Since the condensated water collection tank 3 is close to the reaction tank 2, condensated water in the condensated water collection tank 3 can also cool a material in the reaction tank 2.

In order to achieve a prominent condensation effect for a water vapor, a condensation plate can also be provided, as shown in FIGS. 1 to 4. In some embodiments of the present disclosure, the production apparatus further includes a plurality of condensation plates 1-10, and the plurality of condensation plates penetrate through the left and right side walls of the shell 1-1 at positions corresponding to the plurality of heating rollers 1-2-1 (1-2-2, 1-2-3).

A water vapor is condensed into liquid water on the condensation plates 1-10, and the liquid water flows into the U-shaped cavity 1-9 under a drainage action of the condensation plates 1-10. In order to make an ambient temperature not affect a temperature of the heating rollers, intersections between the condensation plates 1-10 and the shell 1-1 are sealed, which can be achieved through welding, for example.

As shown in FIGS. 1 to 4, in some embodiments of the present disclosure, the shell 1-1 is provided with a first vacuum pipe 1-12, and the first vacuum pipe 1-12 may be connected to a vacuum pump (not shown in the figures). The vacuum pump can provide a negative pressure for the shell 1-1, such that the moisture in the reaction solution can be easily evaporated into a water vapor and the water vapor can be extracted from the shell 1-1, thereby achieving the purpose of quickly removing the moisture from the reaction solution. It should be noted that FIG. 4 shows a half without the liquid evaporation residue discharge pipe 1-7 of the distillation separation tank 1 obtained by taken along a radial cross section through intermediate positions of the front and rear side walls of the shell 1-1. Therefore, the liquid evaporation residue discharge pipe 1-7 is not shown in FIG. 4.

As shown in FIGS. 3 to 5, in some embodiments of the present disclosure, 3 heating rollers are provided, which are a first heating roller 1-2-1, a second heating roller 1-2-2, and a third heating roller 1-2-3 from top to bottom. An end of the feed pipe 1-3 located in the shell 1-1 is connected to a liquid material dispersion pipe 1-11. That is, the feed pipe 1-3 and the liquid material dispersion pipe 1-11 are shaped into an inverted T as a whole; and the liquid material dispersion pipe 1-11 at a horizontal end of the inverted T is located above the first heating roller 1-2-1, and a drainage groove (not shown in the figures) and a plurality of discharge ports (not shown in the figures) are formed inside the liquid material dispersion pipe 1-11, such that the reaction solution entering through the feed pipe 1-3 can uniformly flow over a large area to the first heating roller 1-2-1. It should be noted that FIG. 5 shows a half without the condensated water outlet pipe 1-6 of the distillation separation tank 1 obtained by taken along a radial cross section through intermediate positions of the left and right side walls of the shell 1-1. Therefore, the condensated water outlet pipe 1-6 is not shown in FIG. 5.

As shown in FIG. 2, in some embodiments of the present disclosure, the heating-roller distillation device 1-2 includes a power supply module 1-2-4, and the power supply module 1-2-4 is electrically connected to each heating roller to provide electrical energy for a heat transfer medium of the heating roller. The heat transfer medium in the heating roller is usually a metal heat conductor, such as a resistance wire: the power supply module 1-2-4 provides electrical energy for the heat transfer medium of the heating roller, and the heat transfer medium can convert the electrical energy into heat energy, thereby realizing the heating of the reaction solution. In some embodiments of the present disclosure, the power supply module 1-2-4 may be arranged on any of the front and rear side walls of the shell 1-1. The present disclosure has no limitation on a set position of the power supply module 1-2-4, as long as the set position is reasonable and does not affect the rotation of the heating roller.

As shown in FIG. 2, the heating-roller distillation device 1-2 further includes a drive module 1-2-5; the drive module 1-2-5 includes a motor and a gear train (not shown in the figures); and the motor is connected to the gear train, the gear train is connected to each heating roller, and the motor drives each heating roller to rotate via the gear train. In some embodiments of the present disclosure, the drive module 1-2-5 may be arranged on the front or rear side wall of the shell 1-1 that is not provided with the power supply module 1-2-4. The present disclosure has no limitation on a set position of the drive module 1-2-5, as long as the set position is reasonable and does not affect the rotation of the heating roller. It should be noted that, when each heating roller is driven by the gear train to rotate, the heating rollers rotate at a same angular velocity regardless of radii of the heating rollers.

As shown in FIG. 4 and FIG. 5, 3 heating rollers are provided, for example. It can be seen from the figures that the diameters and lengths of the heating rollers increase gradually from top to bottom, that is, a diameter of the first heating roller 1-2-1 is less than a diameter of the second heating roller 1-2-2 and a diameter of the second heating roller 1-2-2 is less than a diameter of the third heating roller 1-2-3; and a length of the first heating roller 1-2-1 is less than a length of the second heating roller 1-2-2 and a length of the second heating roller 1-2-2 is less than a length of the third heating roller 1-2-3. In addition, two adjacent heating rollers are arranged to rotate in opposite directions. For example, if the first heating roller 1-2-1 is arranged to rotate in a clockwise direction, the second heating roller 1-2-2 is arranged to rotate in a counterclockwise direction, the third heating roller 1-2-3 is arranged to rotate in a clockwise direction, and so on.

In this way, after entering through the feed pipe 1-3, the reaction solution is gradually dispersed on a surface of the first heating roller 1-2-1, then enters a tiny gap between the first heating roller 1-2-1 and the second heating roller 1-2-2 with the rotation of the first heating roller 1-2-1, spreads along a surface of the second heating roller 1-2-2, and then enters a tiny gap between the second heating roller 1-2-2 and the third heating roller 1-2-3, such that the reaction solution is repeatedly rolled and squeezed into a very thin liquid film; and in the above process, the reaction solution is always heated and gradually separated into a water vapor and the liquid evaporation residue, which is an ideal state. Due to factors such as the viscosity of the reaction solution and the rotational speed of the heating roller, the most ideal state cannot be reached. With the movement of the reaction solution on the surface of the first heating roller 1-2-1 as an example, a part of the reaction solution drops from the surface of the first heating roller 1-2-1 when moving to a horizontal position such as three o'clock of the first heating roller 1-2-1; and when the diameter and length of the second heating roller 1-2-2 are greater than a diameter and length of the first heating roller 1-2-1, the dropped reaction solution will fall on the second heating roller 1-2-2, and will not drop from a surface of the heating roller to the bottom of the shell 1-1, which avoids a waste of the reaction solution and does not cause the difficult cleaning of the shell 1-1. Similarly, when the reaction solution moves on surfaces of the second heating roller 1-2-2 and the third heating roller 1-2-3, there is also the same problem. As shown in FIG. 3 and FIG. 4, in some embodiments, the diameter of the third heating roller 1-2-3 may be arranged to be less than a width of the inner cavity formed by the U-shaped plate 1-4, and the reaction solution dropped from the surface of the third heating roller 1-2-3 can fall in the inner cavity formed by the U-shaped plate 1-4 without overflow.

In addition, due to a consistent angular velocity of the heating rollers, linear speeds of the heating rollers increase from top to bottom, such that a liquid film is formed fast in a large area during a friction process of the heating rollers, which effectively maintains the distillation efficiency during progressive temperature decrease and improves the product yield.

In some embodiments of the present disclosure, in the above production apparatus, preset heating temperatures of the plurality of heating rollers may successively decrease from top to bottom. The preset temperatures of the heating rollers gradually decrease from top to bottom, which not only reduces a cooling load for the liquid evaporation residue to be esterified, but also reduces the energy consumption of the production apparatus.

As shown in FIG. 4 and FIG. 5, in order to prevent the reaction solution from overflowing from two end faces of each of the heating rollers, in some embodiments, each of two ends of the first heating roller 1-2-1 is provided with a first circular baffle plate 1-2-1-1 that has a diameter greater than a diameter of the first heating roller, and each of two ends of the third heating roller 1-2-3 is provided with a second circular baffle plate 1-2-3-1 that has a diameter greater than a diameter of the third heating roller, such that the first circular baffle plate 1-2-1-1 prevents the reaction solution on the surface of the first heating roller 1-2-1 from overflowing, and the second circular baffle plate 1-2-3-1 can prevent the reaction solutions on the surfaces of both the second heating roller 1-2-2 and the third heating roller 1-2-3 from overflowing. Thus, through the design of the circular baffle plates, the reaction solution or liquid evaporation residue can be effectively prevented from overflowing from two ends of each of the heating rollers.

As shown in FIG. 4 and FIG. 5, in order to effectively fix the circular baffle plates, in some embodiments, a first groove 1-2-2-4 may be formed at each of two ends of the second heating roller 1-2-2, and the first circular baffle plate 1-2-1-1 is embedded in the first groove 1-2-2-1.

As shown in FIG. 3 and FIG. 4, in order to make the reaction solution (namely, the liquid evaporation residue) obtained after distillation on the lowest heating roller (namely, the third heating roller 1-2-3 in this embodiment) thoroughly and completely flow into the inner cavity formed by the U-shaped plate 1-4, a scraper 1-4-1 may be provided at a top end of a side wall of the U-shaped plate 1-4, an outer edge of the scraper 1-4-1 abuts against a surface of the heating roller closest to the scraper (namely, the third heating roller 1-2-3). With a cross section between the scraper 1-4-1 and the third heating roller 1-2-3 as an example, an abutting point is called an intersection point, and an included angle between the scraper 1-4-1 and a tangent line at an intersection point of the scraper with the third heating roller 1-2-3 is less than 90°, which ensures that the scraper is inclined in a direction towards the inner cavity formed by the U-shaped plate 1-4.

In some embodiments of the present disclosure, the U-shaped cavity 1-9 and the inner cavity formed by the U-shaped plate 1-4 each are provided with a liquid level sensor (not shown in the figures) and a temperature sensor (not shown in the figures), such that it is easy to control the reaction conditions and schedule.

In some embodiments of the present disclosure, the heat exchange tubes 1-5 arranged in the inner cavity 1-8 formed by the U-shaped plate 1-4 each include an evaporation section 1-5-1 and a condensation section 1-5-2, the evaporation section 1-5-1 is located inside the shell 1-1, and the evaporation section 1-5-1 is subjected to a heat exchange with each of the liquid evaporation residue and the condensation section 1-5-2. Specifically, the evaporation section 1-5-1 absorbs the heat of the liquid evaporation residue and then transfers the heat to the condensation section 1-5-2, and the condensation section 1-5-2 is located outside the shell 1-1 to exchange the heat with the environment, such that the received heat is exchanged into the air to achieve the purpose of heat dissipation.

A specific structure of the heat exchange tube 1-5 is not limited to the above embodiments. For example, a plurality of heat transfer tubes penetrating through the front and rear side walls of the shell 1-1 may also be provided in the inner cavity 1-8 formed by the U-shaped plate 1-4, and an L-shaped heat exchange tube is inserted at each of two ends of each of the heat transfer tubes; an evaporation section of the L-shaped heat exchange tube is located inside the heat transfer tube, and a condensation section of the L-shaped heat exchange tube is located outside the shell 1-1; and a heat dissipation fin is provided, and a heat exchange principle thereof is the same as the above embodiment, which will not be repeated here.

As shown in FIG. 1, in some embodiments of the present disclosure, a first solenoid valve 1-7-1 is provided on the liquid evaporation residue discharge pipe 1-7; a carboxylic ester feed pipe 2-1 and a second vacuum pipe 2-2 are provided at a top of the reaction tank 2, and the second vacuum pipe 2-2 may be connected to a vacuum pump (not shown in the figures); and a product discharge pipe 2-3 is provided at the bottom of the reaction tank 2, and a second solenoid valve 2-3-1 is provided on the product discharge pipe 2-3.

The solenoid valves can be opened or closed for related generation according to needs, which is convenient to the control of the overall generation process; and the vacuum pump can provide a negative pressure environment for a reaction in the reaction tank, which is conducive to the forward progress of an esterification reaction.

As shown in FIG. 1, a third solenoid valve 1-6-1 is provided on the condensated water outlet pipe 1-6; a third vacuum pipe 3-1 is provided at a top of the condensated water collection tank 3, and the third vacuum pipe 3-1 can be connected to a vacuum pump (not shown in the figures); and the condensated water collection tank 3 is provided with an outlet pipe 3-2, and a fourth solenoid valve 3-2-1 is provided on the outlet pipe 3-2.

FIG. 6 is a schematic flow chart of a production method of sucrose-6-ester according to an embodiment of the present disclosure. The method may be implemented with the production apparatus described above. It can be seen from FIG. 6 that the production method of sucrose-6-ester of the present disclosure at least includes the following S610 to S620:

a step of reaction solution separation S610: the heating-roller distillation device is turned on, each heating roller is set to a preset temperature, and the reaction solution is fed through a feed port of the distillation separation tank, such that the reaction solution is separated into a liquid evaporation residue and a water vapor on an outer wall of each heating roller, where the reaction solution includes sucrose, an aprotic polar solvent, and an organotin esterification catalyst; the liquid evaporation residue is collected into the U-shaped cavity and the liquid evaporation residue is allowed to flow into the reaction tank through the liquid evaporation residue discharge pipe; and the water vapor is condensed into liquid water at the left and right side walls of the shell, and the liquid water is allowed to flow to the bottom of the shell and then flow into the condensated water collection tank through the condensated water outlet pipe; and a step of esterification reaction S620: the liquid evaporation residue entering the reaction tank is subjected to an esterification reaction with a carboxylic anhydride entering through the carboxylic ester feed pipe under preset conditions to produce a sucrose-6-ester-containing solution.

With the above production apparatus of sucrose-6-ester as an example, a specific process of the above method can be described as follows: the reaction solution is first prepared, and specifically, sucrose, an aprotic polar solvent, and an organotin acylation catalyst are mixed to obtain the reaction solution.

At an initial stage of production, the fourth solenoid valve 3-2-1, the second solenoid valve 2-3-1, the third solenoid valve 1-6-1, and the first solenoid valve 1-7-1 are closed, the carboxylic ester feed pipe 2-1 is closed, and a vacuum pump extracts air in each of the distillation separation tank 1, the reaction tank 2, and the condensated water collection tank 3 through the first vacuum pipe 1-12, the second vacuum pipe 2-2, and the third vacuum pipe 3-1 to form a negative pressure environment in each of the distillation separation tank 1, the reaction tank 2, and the condensated water collection tank 3. When the reaction solution is continuously fed into the distillation separation tank 1 through the feed pipe 1-3, a vacuum pump corresponding to the distillation separation tank 1 can be opened to make the distillation separation tank 1 in a vacuum low-pressure environment, such that the drive module 1-2-5 drives the first heating roller 1-2-1 to rotate in a clockwise direction, the second heating roller 1-2-2 to rotate in a counterclockwise direction, and the third heating roller 1-2-3 to rotate in a clockwise direction via the gear train. The reaction solution is extruded into a liquid film when flowing downward along the surfaces of the first heating roller 1-2-1, the second heating roller 1-2-2, and the third heating roller 1-2-3, such that water molecules in the reaction solution escape from a surface of the liquid film and are then condensed into liquid water via the condensation plates 1-10, and the liquid water flows into the U-shaped cavity 1-9, which avoids the use of a gas or solvent vapor capable of removing water, and effectively reduces the economic cost and time cost of water removal. The reaction solution with water removed (namely, the liquid evaporation residue) flows into the inner cavity formed by the U-shaped plate 1-4 under the barrier of the scraper 1-4-1.

The heat exchange tubes 1-5 arranged in the inner cavity formed by the U-shaped plate 1-4 exchange the heat with the liquid evaporation residue to cool the liquid evaporation residue, and condensated water stored in the U-shaped cavity 1-9 can also additionally cool the liquid evaporation residue. When the condensated water in the U-shaped cavity 1-9 is at a set liquid level, the third solenoid valve 1-6-1 is opened, such that the condensated water enters the condensated water collection tank 3. When the temperature and liquid level of the liquid evaporation residue in the U-shaped plate 1-4 reach preset values, the first solenoid valve 1-7-1 is opened; and after an amount of the liquid evaporation residue flowing into the reaction tank 2 reaches a specified value, the first solenoid valve 1-7-1 can be closed, and a carboxylic anhydride is fed into the reaction tank 2, such that the carboxylic anhydride and the liquid evaporation residue are mixed in the reaction tank 2 to allow an esterification reaction to obtain the target product sucrose-6-ester. The prepared sucrose-6-ester can be discharged through the product discharge pipe 2-3 under the control of the second solenoid valve 2-3-1. The vacuum pump then extracts air in the reaction tank 2 through the second vacuum pipe 2-2. In this way, the continuous production of the sucrose-6-ester can be realized.

In the above method, a rotational speed of each of the heating rollers is not limited in the present disclosure. In some embodiments of the present disclosure, an angular velocity may be set to 0.1 rad/s to 10 rad/s. If the heating rollers each have a rotational angular velocity of less than 0.1 rad/s, the reaction solution is easy to drop from surfaces of the heating rollers and cannot be formed into a liquid film, thereby affecting the evaporation effect. If the heating rollers each have a rotational angular velocity of greater than 10 rad/s, the reaction solution undergoes evaporation too short, which is not conducive to the separation of moisture.

The raw materials and preset conditions for the esterification reaction in the above method are not limited, which can refer to the prior art and can also be adopted according to the following recommended technical solutions.

In the present disclosure has no limitation on a type of the organotin compound, and a monotin organic compound or a bitin organic compound can be adopted. In some embodiments, the organotin compound is optionally any one or more selected from the group consisting of 1,3-dihydrocarbyloxy-1,1,3,3-tetra-(hydrocarbyl)distannoxane, tin di(hydrocarbyl)oxide, 1,3-diacyloxy-1,1,3,3-tetra-(hydrocarbyl)distannoxane, and 1-diacyloxy-1,1,3,3-tetra-(hydrocarbyl)distannoxane. In some other embodiments, the organotin compound is optionally 1,3-diacyloxy-1,1,3,3-tetra-(hydrocarbyl)distannoxane. In some other embodiments, the organotin compound is optionally 1,3-diacetoxy-1,1,3,3-tetrabutyldistannoxane. The hydrocarbyloxy is optionally selected from the group consisting of alkoxy and phenoxy. In some embodiments, the alkoxy is optionally selected from the group consisting of methoxy, ethoxy, n-propoxy, n-butoxy, n-pentoxy, and n-hexoxy. In some other embodiments, the alkoxy is optionally methoxy. In some embodiments, the hydrocarbyl is optionally selected from the group consisting of alkyl, cycloalkyl, aryl, and aralkyl. In some other embodiments, the hydrocarbyl is optionally alkyl; and in some other embodiments, the hydrocarbyl is optionally normal-butyl.

The present disclosure has no limitation on a type of the polar aprotic solvent. In some embodiments, the polar aprotic solvent is any one or more selected from the group consisting of acetonitrile, 1,4-dioxane, methyl ethyl ketone (MEK), methyl isobutyl ketone (MIK), nitromethane, nitroethane, cyclohexanone, dimethyl sulfoxide (DMSO), N-methylpyrrolidone (NMP), N,N-dimethylacetamide (DMA), hexamethylphosphoramide (HMPA), and N,N-dimethylformamide (DMF); and in some other embodiments, the polar aprotic solvent is acetonitrile.

The present disclosure has no limitation on an amount of the polar aprotic solvent. In some embodiments, based on a mass of sucrose, a ratio of a mass of the solvent to the mass of the sucrose can be 2 to 20; in some other embodiments, the ratio of the mass of the solvent to the mass of the sucrose can be 3 to 10; and in some other embodiments, the ratio of the mass of the solvent to the mass of the sucrose can be 4 to 8.

The present disclosure has no limitation on a heating temperature for the reaction solution. In some embodiments, the heating temperature may be 65° C. to 150° C.; and in some other embodiments, the heating temperature may be 85° C. to 120° C.

In the present disclosure, when the vacuum pipe is connected to a vacuum pump, a negative pressure in the production apparatus is not limited. In some embodiments, the negative pressure in the production apparatus may be maintained at 0.01 kPa to 50 kPa; and in some other embodiments, the negative pressure in the production apparatus may be maintained at 0.5 kPa to 20 kPa.

The present disclosure has no limitation on a type of the carboxylic anhydride, and the carboxylic anhydride is any one selected from the group consisting of acetic anhydride, butyric anhydride, benzoic anhydride, stearic anhydride, and lauric anhydride and is preferably acetic anhydride. The above types of organic acid anhydrides lead to the corresponding sucrose-6-carboxylates sucrose-6-acetate, sucrose-6-butyrate, sucrose-6-benzoate, sucrose-6-fatty acid ester, and sucrose-6-laurate. The sucrose-6-acetate and sucrose-6-benzoate can be used as raw materials for synthesizing other sucrose-6-carboxylates and can also be used as intermediates for synthesizing a sweetener sucralose; and the other types of sucrose-6-carboxylate can be used as food additives, chemical products, and synthetic intermediates for other reactions.

The present disclosure has no limitation on an amount of the carboxylic anhydride. In some embodiments, based on the mass of sucrose, a ratio of the mass of the carboxylic anhydride to the mass of the sucrose may be 0.6 to 3.0; and in some other embodiments, the ratio of the mass of the carboxylic anhydride to the mass of the sucrose may be 0.8 to 1.

The present disclosure has no limitation on the reaction conditions of the esterification reaction. In some embodiments, the esterification reaction may be conducted at 0° C. to 50° C.; and in some other embodiments, the esterification reaction may be conducted at 1° C. to 20° C. In some embodiments, the esterification reaction may be conducted for 10 min to 24 h; and in some other embodiments, the esterification reaction may be conducted for 30 min to 4 h.

It should be noted that reaction conditions, not exhaustively described above, may refer to the prior art.

Testing methods and reagent sources involved in the present disclosure are as follows:

High-Performance Liquid Chromatography (for Testing the Contents of Sucrose, Sucrose-6-Ester, and the Like in a Reaction Product)

High-performance liquid chromatograph of Shimadzu, Japan: RID-10A differential refractive index detection, LC-10ADVP high-pressure pump, and CTO-10ASVP incubator; chromatographic column: Agilent XDB C18 column (250 mm×4.6 mm, 5 μm); mobile phase: methanol-0.125% dipotassium phosphate (DKP) aqueous solution (4:6); column temperature; 30° C.; and flow rate: 1.0 mL/min. Methanol (chromatographically pure), DKP (analytically pure), ultrapure water (UPW), and sucralose (purity: 99.9%) are required, and the content is determined by an external standard method.

Moisture Test Method

A moisture content is determined by the Karl Fischer method, which can refer to the prior art and will not be repeated in various examples.

Reagent Sources

The chemical reagents involved in the present disclosure and the raw material for preparing sucrose-6-ester may be commercially available, which are not limited in the present disclosure.

Example 1

Sucrose, an organotin esterification catalyst (1,1,3-diacetoxy-1,1,3,3-tetrabutyldistannoxane), and an aprotic polar solvent (DMF) were taken in a mass ratio of 1:2:10 and prepared into 300 kg of a reaction solution.

The production apparatus of sucrose-6-ester of the present disclosure was used to produce a sucrose-6-ester as follows: The heating-roller distillation device was turned on, a temperature of each heating roller was set to 80° C., and a velocity of each heating roller was set to 0.1 rad/s. Then the reaction solution prepared above was continuously fed into the production apparatus at a rate of 4 $m^3$/h, the reaction tank was maintained at a negative pressure of 0.5 kPa, and each valve was set to be in a corresponding state.

When a temperature of the inner cavity formed by the U-shaped plate reached 15° C. and a liquid level of the liquid evaporation residue reached a preset value, the first solenoid valve was opened and an esterification reaction was conducted under preset conditions.

A sample could be taken and tested for a moisture content, and the moisture content in this example was lower than 500 ppm.

With a mass ratio of sucrose to an acetic anhydride being 1:1.1, the acetic anhydride was fed into the reaction tank to allow an acylation reaction, and it took about 1 h from the beginning of mixing of the two to the final discharge of a resulting reaction system from a reaction product discharge port. After the esterification reaction was completed, water was added with a volume ratio of the water to the reaction solution being 0.25:1 to perform a quenching reaction, and hexane was added with a volume ratio of the hexane to the reaction solution being 1:1 to extract the organotin esterification catalyst to obtain a sucrose-6-acetate solution. The content of each substance was analyzed by HPLC (high-performance liquid chromatography). The normalization below and in the following examples means that, when a mixture is subjected to separation assay by HPLC, a sum of all substances is specified as 100%, and a percentage of each substance to all substances is determined according to a peak area. The product distribution was as follows:
a. sucrose-6-acetate: 89.95% (normalized);
b. diacetate: 7.05% (normalized); and
c. sucrose: 0.28% (normalized).

Example 2

Sucrose, an organotin esteritication catalyst (1,1,3-diacetoxy-1,1,3,3-tetrabutyldistannoxane), and an aprotic polar solvent (DMF) were taken in a mass ratio of 1:2:10 and prepared into 500 kg of the reaction solution.

The production apparatus of sucrose-6-ester of the present disclosure was used to produce a sucrose-6-ester as follows: The heating-roller distillation device was turned on; a temperature of a first heating roller was set to 80° C., a temperature of a second heating roller was set to 70° C., and a temperature of a third heating roller was set to 60° C.; and a velocity of each heating roller was set to 0.5 rad/s. Then the reaction solution prepared above was continuously fed into the production apparatus at a rate of 6 m³/h, the reaction tank was maintained at a negative pressure of 0.8 kPa, and each valve was set to be in a corresponding state.

When a temperature of the inner cavity formed by the U-shaped plate reached 10° C. and a liquid level of the liquid evaporation residue reached a preset value, the first solenoid valve was opened and an esteritication reaction was conducted under preset conditions.

A sample could be taken and tested for a moisture content, and the moisture content in this example was lower than 50M ppm.

With a mass ratio of sucrose to an acetic anhydride being 1:1.1, the acetic anhydride was fed into the reaction tank to allow an acylation reaction, and it took about 1.5 h from the beginning of mixing of the two to the final discharge of a resulting reaction system from a reaction product discharge port. After the esterification reaction was completed, water was added with a volume ratio of the water to the reaction solution being 0.25:1 to perform a quenching reaction, and hexane was added with a volume ratio of the hexane to the reaction solution being 1:1 to extract the organotin esterification catalyst to obtain a sucrose-6-acetate solution. The content of each substance was analyzed by HPLC. The product distribution was as follows:
a. sucrose-6-acetate: 90.60% (normalized);
b. diacetate: 7.00%/c (normalized); and
c. sucrose: 0.24% (normalized).

Example 3

Sucrose, an organotin esterification catalyst (1,1,3-diacetoxy-1,1,3,3-tetrabutyldistannoxane), and an aprotic polar solvent (DMF) were taken in a mass ratio of 1:2:10 and prepared into 800 kg of the reaction solution.

The production apparatus of sucrose-6-ester of the present disclosure was used to produce a sucrose-6-ester as follows: The heating-roller distillation device was turned on; a temperature of a first heating roller was set to 90° C., a temperature of a second heating roller was set to 70° C., and a temperature of a third heating roller was set to 60° C.; and a velocity of each heating roller was set to 0.3 rad/s. Then the reaction solution prepared above was continuously fed into the production apparatus at a rate of 8 m/h, the reaction tank was maintained at a negative pressure of 1.0 kPa, and each valve was set to be in a corresponding state.

When a temperature of the inner cavity formed by the U-shaped plate reached 20° C., an esterification reaction was conducted.

A sample could be taken and tested for a moisture content, and the moisture content in this example was lower than 450 ppm.

With a mass ratio of sucrose to an acetic anhydride being 1:1.1, the acetic anhydride was fed into the reaction tank to allow an acylation reaction, and it took about 1.5 h from the beginning of mixing of the two to the final discharge of a resulting reaction system from a reaction product discharge port. After the esterification reaction was completed, water was added with a volume ratio of the water to the reaction solution being 0.25:1 to perform a quenching reaction, and hexane was added with a volume ratio of the hexane to the reaction solution being 1:1 to extract the organotin esterification catalyst to obtain a sucrose-6-acetate solution. The content of each substance was analyzed by HPLC. The product distribution was as follows:
a. sucrose-6-acetate: 91.50% (normalized);
b. diacetate: 6.90°/(normalized); and
c. sucrose: 0.20% (normalized).

Comparative Example 1

Sucrose, an organotin esterification catalyst (1,1,3-diacetoxy-1,1,3,3-tetrabutyldistannoxane), and an aprotic polar solvent (DMF) were taken in a mass ratio of 1:2:10 and prepared into 300 kg of the reaction solution, and the reaction solution was heated at 90° C. for dissolution to obtain a reaction mixed solution.

A packed tower was used for dehydration, and the packed tower had a diameter of 40 mm and was packed with a 3×8 glass spring packing at a packing height of 1 m, which was equivalent to 10-stage tower plates.

The reaction mixed solution prepared above was fed from an inlet at a top of the packed tower, with a negative pressure of 0.5 kPa; and a cyclohexane vapor (100° C., 4 atm) was fed from a gas inlet at a bottom of the packed tower. The reaction mixed solution and the cyclohexane vapor were in countercurrent contact to allow a reaction. A distillate (a vapor including cyclohexane, water, and DMF) discharged from the top of the packed tower was condensed, collected, dried to remove water, and then recycled.

A liquid sample was collected at the bottom of the packed tower, which was transparent and light-amber. A retention time of the reaction solution in a gas-liquid exchange reactor was about 1 min.

A sucrose content of a resulting solution was calculated to be 10%. The resulting solution was pressed into another reactor, then acetic anhydride was added at a temperature lower than 10° C. with a mass ratio of sucrose to acetic anhydride being 1:1.1 to allow an acylation reaction at a temperature lower than 10° C. for 2 h, and then water was added according to a ratio of 0.25:1 for perform a quenching reaction; and cyclohexane was added according to a ratio of 1:1 for extracting the organotin compound, and a resulting sucrose-6-acetate solution was analyzed by HPLC. Analysis results of the products were as follows:
a. sucrose-6-acetate: 72.05% (normalized),
b. diacetate: 4.36% (normalized); and
c. sucrose: 22.76% (normalized).

It can be seen from Examples 1 to 3 and Comparative Example 1 that, compared with the production apparatus using a packing in Comparative Example 1, the production apparatus provided in the present disclosure can lead to a high sucrose-6-carboxylate yield, a low side reaction occurrence probability, and a complete sucrose reaction. It can be known that the sucrose-6-acetate yield can reach 91.50% (normalized) in some examples of the present disclosure, but is only 72.05% (normalized) in Comparative Example 1, that is, the sucrose-6-carboxylate yield in the present disclosure is significantly higher than that in the prior art. Similarly, it can be seen from the diacetate and sucrose contents in the reaction products that the side reaction occurrence probability of the present disclosure is significantly reduced, and the conversion of sucrose in the present disclosure is more thorough.

In summary, the present disclosure has the following beneficial effects: A production apparatus provided with a heating-roller distillation device is designed, such that a reaction solution can be rolled into a thin liquid film under the cooperation of a plurality of heating rollers, and then heated and distilled, thereby achieving the purpose of efficiently removing the moisture in the reaction solution to prepare the sucrose-6-ester. In addition, the distillation tank and the reaction tank are arranged from top to bottom, and thus without additional power, the liquid evaporation residue can smoothly enter the reaction tank and perform an esterification reaction to produce a target product. The production apparatus of the present disclosure achieves the integration of distillation, cooling, mixing, and reaction steps of a preparation process of sucrose-6-ester, such that raw materials can be continuously fed into the production apparatus. The reaction solution separation and esterification reaction steps are performed without interruption, such that a sucrose-6-ester can be continuously produced, which greatly shortens the production cycle and improves the production efficiency of the sucrose-6-ester. The production apparatus has a small overall volume, a small floor space, a simple structure, and strong economy, which avoids the use of a large amount of a gas or solvent vapor capable of removing water in the process existing in the prior art, greatly reduces the production cost, and overcomes the defects in the prior art such as high energy consumption and high time consumption caused by the fact that the second reaction mixture needs to be pressed into another space and then mixed with a carboxylic anhydride. The above are merely specific implementations of the present disclosure, and under the above instruction of the present disclosure, those skilled in the art may make other improvements or variations on the basis of the above examples. Those skilled in the art should understand that the above specific description is merely intended to well explain the purpose of the present disclosure, and a protection scope of the present disclosure shall be subject to the protection scope of the claims.

The above are merely specific implementations of the present disclosure, and under the above instruction of the present disclosure, those skilled in the art may make other improvements or variations on the basis of the above examples. Those skilled in the art should understand that the above specific description is merely intended to well explain the purpose of the present disclosure, and a scope of the present disclosure shall be subject to the scope of the claims.

In addition, those skilled in the art can understand that, although some examples herein include some features included in other examples but no other features, a combination of features of different examples falls within the scope of the present disclosure and forms a different example. For example, in the claims, any one of the claimed examples can be used in any combination.

It should be noted that the above examples are provided to illustrate rather than limit the present disclosure, and those skilled in the art can design alternative examples without departing from the scope of the appended claims. In the claims, any reference sign between brackets should not be construed as a limitation on to the claims. The word "include" does not exclude the presence of elements or steps not listed in the claims. The word "one" or "a/an" preceding an element does not exclude the existence of multiple such elements. The present disclosure can be implemented with the assistance of hardware including several different components and the assistance of a properly programmed computer. In the unit claims where several apparatuses are listed, several of the apparatuses may be embodied by the same hardware item. The use of words such as first, second, and third does not indicate any order. The words may be interpreted as names.

What is claimed is:

1. A production apparatus of sucrose-6-ester, comprising:
   a distillation separation tank, a reaction tank, and a condensated water collection tank, wherein the distillation separation tank is arranged above the reaction tank and the condensated water collection tank;
   the distillation separation tank comprises a shell, a heating-roller distillation device, a feed pipe, a U-shaped plate, a plurality of heat exchange tubes, a condensated water outlet pipe, and a liquid evaporation residue discharge pipe; the heating-roller distillation device comprises a plurality of heating rollers horizontally and closely arranged from top to bottom between front and rear side walls of the shell; two ends of the U-shaped plate are fixed to bottoms of the front and rear side walls of the shell, respectively, and the U-shaped plate is arranged to be not in contact with left and right side walls and a bottom surface of the shell and forms a U-shaped cavity; the plurality of heat exchange tubes are arranged in an inner cavity formed by the U-shaped plate and penetrate through the front and rear side walls of the shell; the feed pipe is provided at a top of the shell, the condensated water outlet pipe is arranged at the bottom surface of the shell, and the liquid evaporation residue discharge pipe penetrates through the bottom surface of the shell and is connected to the U-shaped plate;
   the condensated water collection tank is connected to the condensated water outlet pipe; and
   the reaction tank is connected to the liquid evaporation residue discharge pipe.

2. The production apparatus according to claim 1, further comprising a plurality of condensation plates penetrating through the left and right side walls of the shell at positions corresponding to the plurality of heating rollers.

3. The production apparatus according to claim 1, wherein an end of the feed pipe located in the shell is connected to a liquid material dispersion pipe.

4. The production apparatus according to claim 1, wherein the heating-roller distillation device comprises a power supply module electrically connected to each heating roller to provide electrical energy for a heat transfer medium of the heating roller; and
   a drive module comprising a motor and a gear train, wherein the motor is connected to the gear train, the gear train is connected to each heating roller, and the motor drives each heating roller to rotate via the gear train.

5. The production apparatus according to claim 1, wherein diameters and lengths of the plurality of heating rollers increase gradually from top to bottom; and adjacent two heating rollers are arranged to rotate in opposite directions.

6. The production apparatus according to claim 5, wherein the plurality of heating rollers comprises three heating rollers, which are a first heating roller, a second heating roller, and a third heating roller from top to bottom;
- each of two ends of the first heating roller is provided with a first circular baffle plate having a diameter greater than a diameter of the first heating roller;
- each of two ends of the second heating roller is provided with a first groove, and the first circular baffle plate is embedded in the first groove;
- each of two ends of the third heating roller is provided with a second circular baffle plate having a diameter greater than a diameter of the third heating roller; and
- a diameter of the third heating roller is less than a width of the inner cavity formed by the U-shaped plate.

7. The production apparatus according to claim 1, wherein in the production apparatus, preset heating temperatures of the plurality of heating rollers decrease gradually from top to bottom.

8. The production apparatus according to claim 1, wherein a scraper is provided at a top end of a side wall of the U-shaped plate, an outer edge of the scraper abuts against a heating roller closest to the scraper, and an included angle between the scraper and a tangent line at an intersection point of the scraper with the heating roller closest to the scraper is less than 90°.

9. The production apparatus according to claim 1, wherein the U-shaped cavity and the inner cavity of the U-shaped plate each are provided with a liquid level sensor and a temperature sensor.

10. The production apparatus according to claim 1, wherein the plurality of heat exchange tubes each comprise an evaporation section located inside the shell and a condensation section located outside the shell.

11. The production apparatus according to claim 1, wherein a first solenoid valve is provided on the liquid evaporation residue discharge pipe; a carboxylic ester feed pipe and a second vacuum pipe are provided at a top of the reaction tank, and the second vacuum pipe is connected to a second vacuum pump; and a product discharge pipe is provided at a bottom of the reaction tank, and a second solenoid valve is provided on the product discharge pipe.

12. The production apparatus according to claim 1, wherein a third solenoid valve is provided on the condensated water outlet pipe; a third vacuum pipe is provided at a top of the condensated water collection tank, and the third vacuum pipe is connected to a third vacuum pump; and the condensated water collection tank is provided with a water outlet pipe, and a fourth solenoid valve is provided on the water outlet pipe.

13. The production apparatus according to claim 1, wherein the shell is provided with a first vacuum pipe, and the first vacuum pipe is connected to a first vacuum pump.

14. The production apparatus according to claim 1, wherein the shell has an approximately trapezoidal cross section.

15. A production method of sucrose-6-ester, wherein the production method is implemented by the production apparatus according to claim 1, the production method comprising:
- a step of reaction solution separation: turning on the heating-roller distillation device, setting each heating roller to a preset temperature, and feeding a reaction solution through a feed port of the distillation separation tank, such that the reaction solution is separated into a liquid evaporation residue and a water vapor on an outer wall of each heating roller, wherein the reaction solution comprises sucrose, an aprotic polar solvent, and an organotin esterification catalyst; collecting the liquid evaporation residue into the U-shaped cavity and allowing the liquid evaporation residue to flow into the reaction tank through the liquid evaporation residue discharge pipe; and condensing the water vapor into liquid water at the left and right side walls of the shell, and allowing the liquid water to flow to the bottom of the shell and then flow into the condensated water collection tank through the condensated water outlet pipe; and
- a step of esterification reaction: performing an esterification reaction by the liquid evaporation residue entering the reaction tank with a carboxylic anhydride entering through the carboxylic ester feed pipe under preset conditions to produce a sucrose-6-ester-containing solution.

16. The production method according to claim 15, wherein a plurality of condensation plates penetrate through the left and right side walls of the shell at positions corresponding to the plurality of heating rollers.

17. The production method according to claim 15, wherein an end of the feed pipe located in the shell is connected to a liquid material dispersion pipe.

18. The production method according to claim 15, wherein the heating-roller distillation device comprises a power supply module electrically connected to each heating roller to provide electrical energy for a heat transfer medium of the heating roller; and
- a drive module comprising a motor and a gear train, wherein the motor is connected to the gear train, the gear train is connected to each heating roller, and the motor drives each heating roller to rotate via the gear train.

19. The production method according to claim 15, wherein diameters and lengths of the plurality of heating rollers increase gradually from top to bottom; and adjacent two heating rollers are arranged to rotate in opposite directions.

20. The production method according to claim 19, wherein the plurality of heating rollers comprises three heating rollers, which are a first heating roller, a second heating roller, and a third heating roller from top to bottom;
- each of two ends of the first heating roller is provided with a first circular baffle plate having a diameter greater than a diameter of the first heating roller;
- each of two ends of the second heating roller is provided with a first groove, and the first circular baffle plate is embedded in the first groove;
- each of two ends of the third heating roller is provided with a second circular baffle plate having a diameter greater than a diameter of the third heating roller; and
- a diameter of the third heating roller is less than a width of the inner cavity formed by the U-shaped plate.

* * * * *